United States Patent [19]

Matsuhira

[11] Patent Number: 5,487,137
[45] Date of Patent: Jan. 23, 1996

[54] PRINT DATA PROCESSING APPARATUS

[75] Inventor: Masatoshi Matsuhira, Nagano, Japan

[73] Assignee: Seiko Epson Corporation, Tokyo, Japan

[21] Appl. No.: 66,247

[22] Filed: May 25, 1993

[30] Foreign Application Priority Data

Jun. 11, 1992 [JP] Japan ..................... 4-152389

[51] Int. Cl.⁶ ..................................... G06F 15/00
[52] U.S. Cl. ............................. 395/115; 395/109
[58] Field of Search ..................... 358/404, 444; 395/102, 109, 115, 116, 117, 110, 111, 150, 151, 164, 165, 166; 400/76; 345/26, 27, 128, 121, 123, 143, 144, 192, 194, 195, 196, 201, 203

[56] References Cited

U.S. PATENT DOCUMENTS

| | | | |
|---|---|---|---|
| 4,330,834 | 5/1982 | Murphy | 364/521 |
| 4,418,344 | 11/1983 | Brown | 340/726 |
| 4,680,578 | 7/1987 | Homig et al. | 340/731 |
| 4,922,237 | 5/1990 | Inoue | 340/723 |
| 5,033,880 | 7/1991 | Kageyama et al. | 400/76 |
| 5,041,994 | 8/1991 | Lahey et al. | 364/519 |
| 5,093,903 | 3/1992 | Sudoh et al. | 395/102 |
| 5,153,575 | 10/1992 | Watts, Jr. et al. | 395/150 |
| 5,251,293 | 10/1993 | Ishii et al. | 395/150 |

FOREIGN PATENT DOCUMENTS

| | | |
|---|---|---|
| 63-072556 | 4/1988 | Japan. |
| 63-265648 | 11/1988 | Japan. |
| 1171949 | 7/1989 | Japan. |
| 3114856 | 5/1991 | Japan. |

*Primary Examiner*—Mark R. Powell
*Assistant Examiner*—Dov Popovici
*Attorney, Agent, or Firm*—Sughrue, Mion, Zinn, Macpeak & Seas

[57] ABSTRACT

A print data processing apparatus includes input data holding means for holding basic data sent from a host computer, an intermediate code converting means for preparing intermediate codes, an intermediate code storage means for sequentially dividing the intermediate codes into a predetermined processing unit and storing the divided intermediate codes, an attribute storage means storing modification data and position data in a sheet forwarding direction of intermediate buffers, an attribute judgment means for selecting data related to a single scanning line to be currently processed based on the position data in the sheet forwarding direction, a print data preparing means for preparing print data, an output data holding means for holding the print data, and a print data transfer means for outputting the print data to a print mechanism. The print data processing apparatus judges which intermediate buffer has the data related to a scanning line area to be processed based on the position data in the sheet forwarding direction in an attribute buffer in the developing operation by the output data holding means. As a result, once a scanning line is printed by the print head, the print head no longer has to print missing portions by going back to a scanning line before such already printed scanning line.

6 Claims, 12 Drawing Sheets

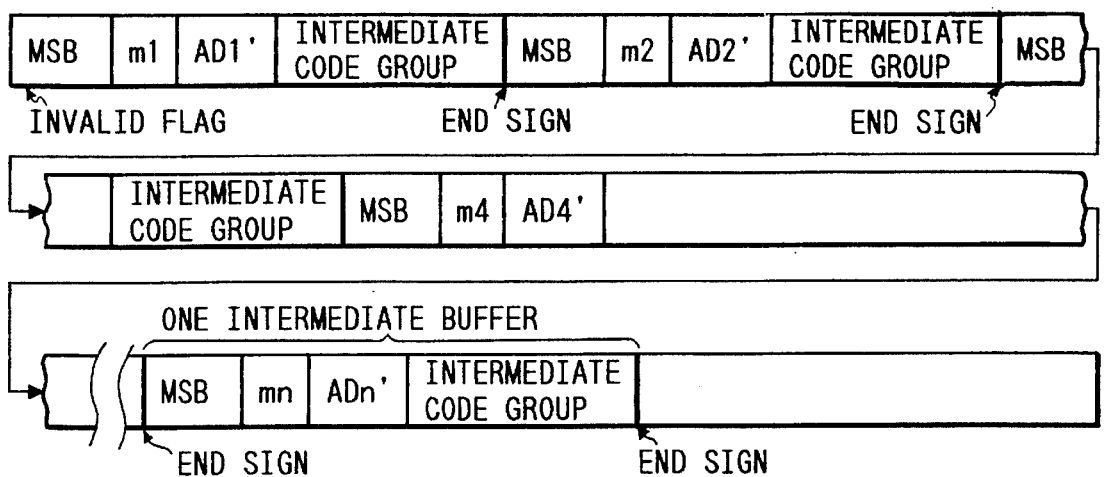

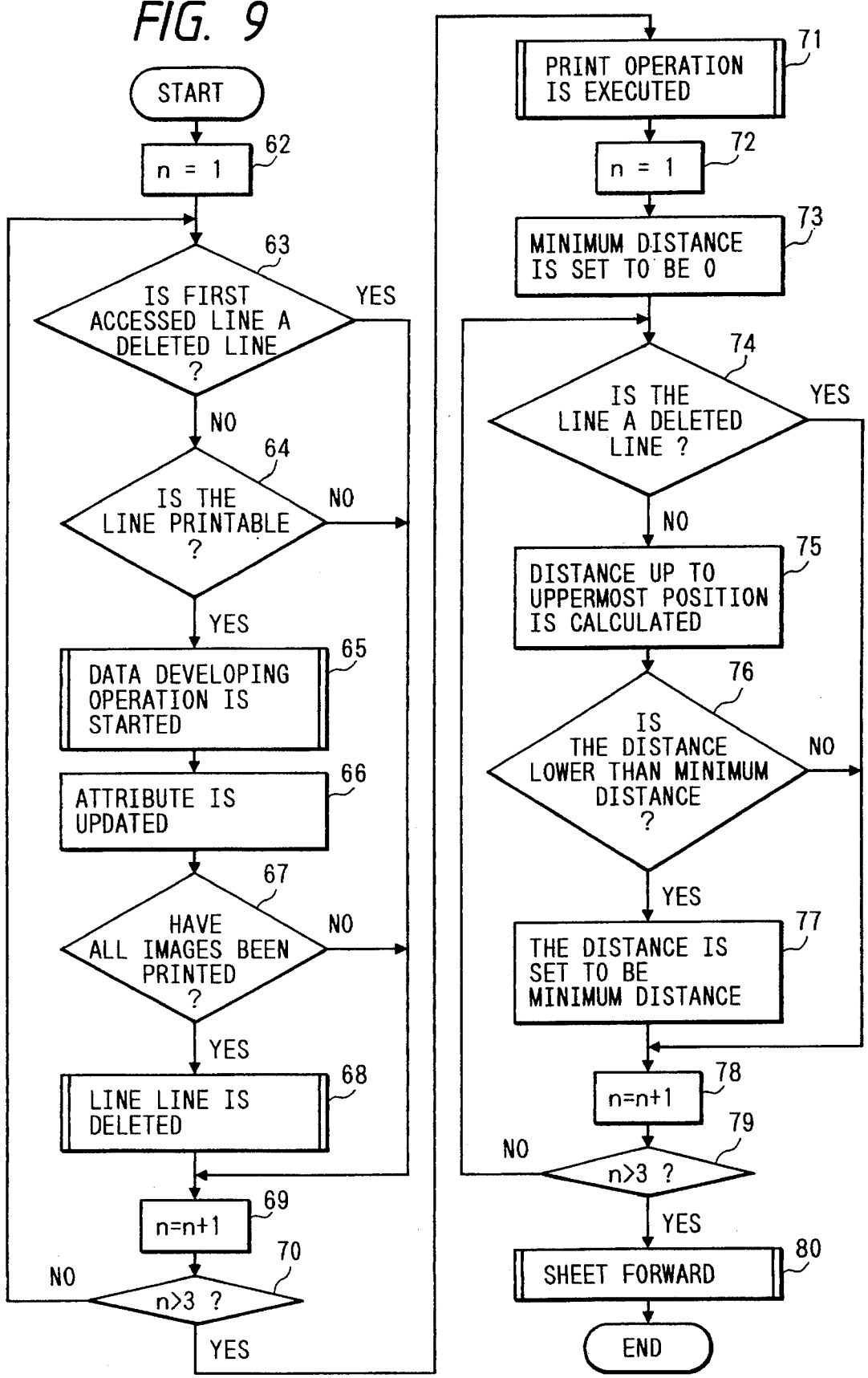

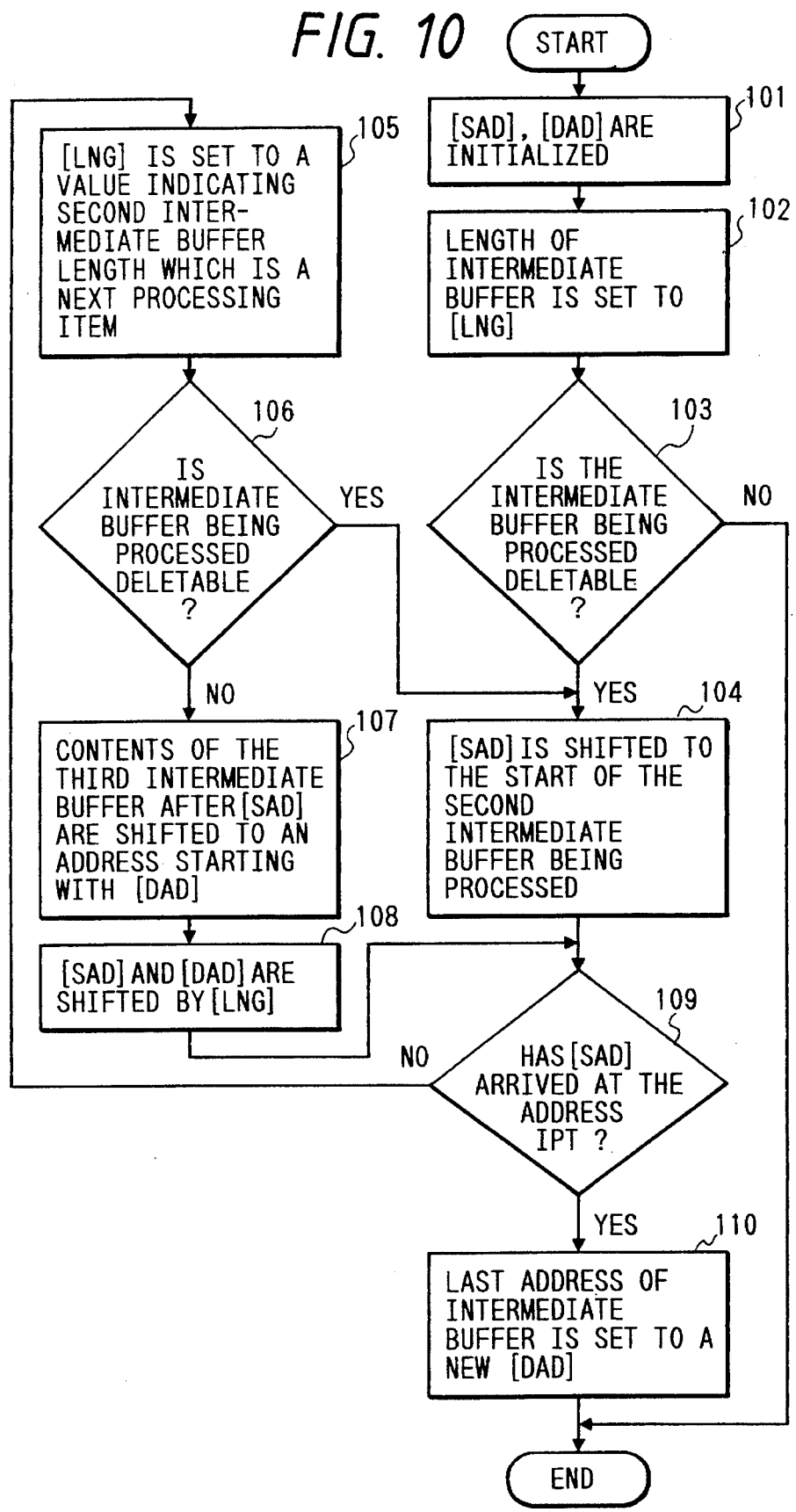

PRINT DATA PROCESSING APPARATUS

BACKGROUND OF THE INVENTION

The present invention relates to a print data processing apparatus allowing enlarged characters extending over a plurality of lines to be printed with a minimal memory capacity and without reverse sheet forwarding in which basic data sent from a host computer is divided by a processing unit, intermediate codes are prepared by the processing unit, and finally, print data is output to a print head in the form of a plurality of successive scanning lines.

With respect to serial printers that print on a printing medium by causing a print head to scan across a plurality of successive parallel scanning lines, various methods of printing enlarged characters whose height is double the height of normal characters and which exceeds the height of the print head have heretofore been known.

Among them is a method of temporarily storing a single operation line of data in an input buffer. This method is advantageous in that it is simple and requires a small RAM capacity. However, this method causes a problem in that the host computer is not freed quickly.

In more detail, if the maximum height of a character to be printed is as large as five scanning lines, the print data processing apparatus must repeat five times the operations of calculating an area present on the first scanning line, which is the object to be processed, with respect to the enlarged character data present in the input buffer, developing a bit image thereof in a working RAM; developing and outputting the image in an output buffer while processing such image with modified data, and doing the same for the second scanning line using the same enlarged character present in the input buffer. As a result, the same data is held five times, suspending the reception of subsequent data from the host computer, during which time the computer cannot be freed to perform other tasks.

To overcome this problem, as described in Japanese Patent Unexamined Publication No. 63-72556, there has been proposed an apparatus as shown in FIG. 4(a) in which two output buffers are provided to reduce the processing time. That is, while one of the output buffers is outputting to a print mechanism, data is being developed in the other output buffer. In this method, various programs controlling the print data processing apparatus are stored in a program ROM 40 and controlled by a CPU.

The print data processing apparatus receives basic data sent from a host computer through an interface 25 and stores the basic data in an input buffer 26. A data analyzing section 6 receives the basic data from the input buffer 26 and classifies the data into character data, print start commands, and other types of commands. Processing is performed for the other types of commands. For the character data, bit map data corresponding to the character data is read from a font ROM 41 and is temporarily developed in a working RAM 42. While processing such image data in the working RAM 42 with necessary modifications, the thus-processed data is developed in the currently selected output buffer 37 through an input channel 28 when all the modifications have been processed.

The input channel 28 switches the output buffer 37 upon being triggered by a print start command. If the output buffer 37 selected by the input channel 28 is concurrently selected by an output channel 35, all the output buffer data is outputted to a print mechanism 39 and the operation of writing data to the output buffer 37 is interrupted until the output channel 35 is switched. The output channel 35 sends the image data from the currently selected output buffer 37 to the print mechanism 39 through an output interface 38 to thereby effect printing. The output channel 35 switches the output buffer 37 to be printed thereafter using the completion of printing of all the images in the output buffer 37 as a trigger. If no print image is present in the output buffer 37 selected by the output channel 35, no printing operation is performed until a next print start command is received.

The foregoing is the sequence of operations in the case of normal characters. Even if a line to be processed includes an enlarged character extending over two scanning lines, a character developing section 18 develops the upper half and the lower half of the enlarged character in either output buffer 37 and the developed halves are sequentially printed.

According to this method, the basic data stored in the input buffer can be processed efficiently, thus allowing the throughput to be improved. Further, if a plurality of output buffers are provided, the time period for which the input buffer is freed can be further reduced.

On the other hand, the output buffer 37 corresponding to a plurality of scanning lines must be implemented by a RAM, which entails the problem of reserving a large storage capacity.

A method designed not to impede the freeing of the host computer has further been proposed. That is, a minimal capacity of the input buffer is reserved while providing a certain area in the RAM for the plurality of scanning lines. This is an attempt to minimize the RAM capacity while not retarding the freeing of the host computer by converting the basic data sent from the host computer and stored in the input buffer to intermediate codes, and storing the converted data as the intermediate codes in the intermediate buffer.

This method will be described in more detail with reference to FIG. 4(b). Similarly to the example shown in FIG. 4(a), various programs for controlling the print data processing apparatus are stored in the program ROM 40 and controlled by the CPU.

The print data processing apparatus receives basic data sent from a host computer through the interface 25 and the received basic data is stored in the input buffer 26. An intermediate code converting section 27 converts the basic data stored in the input buffer 26 to intermediate codes and the intermediate codes are temporarily stored in an intermediate buffer 29. The character developing section 18 retrieves the intermediate codes from the intermediate buffer 29 upon being triggered by a print start command. The character developing section 18 analyzes the intermediate codes and reads the corresponding image data from the font ROM 41.

If the character is a character whose height is double that of the normal character, only images to be printed at the current head positions are retrieved, whereas if the character is a normal character, all the images are developed in the working RAM 42. While adding necessary modifications to the image data in the working RAM 42, the data as modified are developed in the output buffer 37. When a single line of data has been developed, the image data in the output buffer 37 is sent to the print mechanism 39 through the output interface 11, so that printing is started. In the case of normal characters, the intermediate buffer 29 is cleared at this point of the operation, and the data converting operation for the next line is started. If, on the other hand, a double-height character is present in the line, the lower half image is developed and outputted before the intermediate buffer 29 is cleared.

This method, employing an intermediate code, can handle a large volume of data with a small storage capacity and the data is easy to develop, allowing the host computer to be freed in a short period of time without requiring a large storage capacity. The throughput can also be improved.

However, this intermediate code-based method involves reverse sheet forwarding in order to process an enlarged character in the scanning line C, the enlarged character extending into the scanning line B, after having processed the scanning lines A and B as shown in FIG. 6. Such reverse sheet forwarding reduces the throughput and increases sheet forwarding errors due to backlash, thus impairing the print quality. .

SUMMARY OF THE INVENTION

The invention has been made to overcome the above problems. Accordingly, an object of the invention is to provide a print data processing apparatus that processes print data employing intermediate codes, the print data processing apparatus being capable not only of processing the print data at a highest possible speed with a minimal storage capacity and a short host computer time, but also of preventing the throughput and the print quality from being impaired while obviating reverse sheet forwarding.

To achieve the above and other objects, the invention is applied to a print data processing apparatus in which basic data sent from a host computer is divided by a processing unit; the divided data are sequentially processed by the processing unit so that print data can eventually be outputted to a print apparatus on the basis of a unit capable of printing by a single scanning line of a print head. The print data processing apparatus includes at least an input data holding means for holding the basic data received from the host computer through an interface, an intermediate code converting means for preparing intermediate codes using the basic data read from the input data holding means, an intermediate code storage means having a plurality of intermediate buffers for sequentially dividing the intermediate codes prepared by the intermediate code converting means and sequentially storing the divided intermediate codes in groups in respective intermediate buffers, an attribute storage means having a plurality of attribute buffers each storing modification data and position data in a sheet forwarding direction for each of the plurality of groups stored in the intermediate buffers of the intermediate code storage means in such a manner that an attribute buffer corresponds to an intermediate buffer one to one, an attribute judgment means for selecting only an intermediate buffer related to a single scanning line to be currently processed from the intermediate code storage means based on the position data in the sheet forwarding direction stored in the attribute storage means, a print data preparing means for preparing print data from the intermediate codes in the intermediate buffer selected by the attribute judgment means and the modification data in the attribute storage means, an output data holding means for holding the print data prepared by the print data preparing means, a print data transfer means for outputting the print data held in the output data holding means to a print mechanism, and a control means for supervising a group of such plurality of means.

BRIEF DESCRIPTION OF THE DRAWINGS

FIGS. 3(a) to 3(c) are diagrams respectively illustrative of the fixed length system and the successive recording system, and configuration of an attribute storing means;

FIGS (a) and 4(b) are block diagrams showing configurations of a print data processor of which FIG. 4(a) shows a configuration with two output buffers/whereas

FIG. 9 is a flowchart showing the operation of developing and outputting the intermediate buffer and the attribute buffer;

FIG. 10 is a flowchart illustrative of the process of deleting the intermediate buffer.

DESCRIPTION OF THE PREFERRED EMBODIMENTS

An area that can be printed in a single scanning operation with a print head will hereinafter be termed "a single scanning line," and a single processing unit of character data which is divided by a return code "a line." A maximum of n lines can be processed to print an enlarged character extending over a plurality of lines. Printing of such an enlarged character does not necessarily require a shuttling of n scanning lines. The reason is that the print head is, in some cases, 48 dots high with respect to a 24 dot-high standard character.

While fonts are stored in a ROM within the printer in the following embodiments, they may also be stored in a host computer. Further, basic data sent from the host computer includes character code data (character data) and bit image data.

Figure 3A:
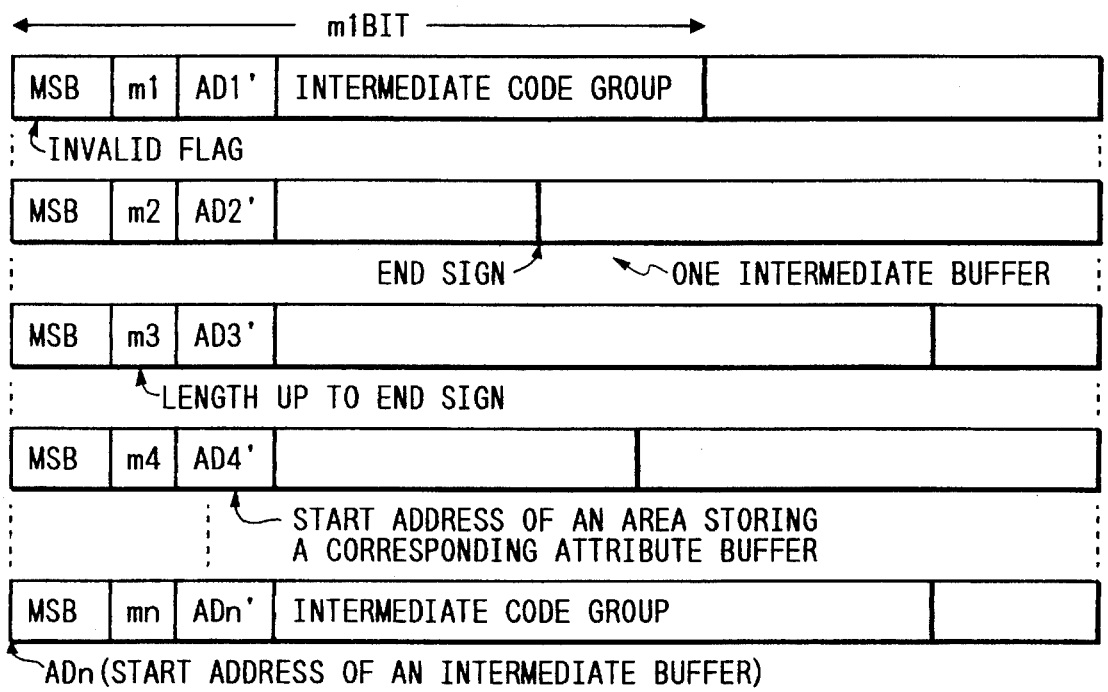
Figure 4A:
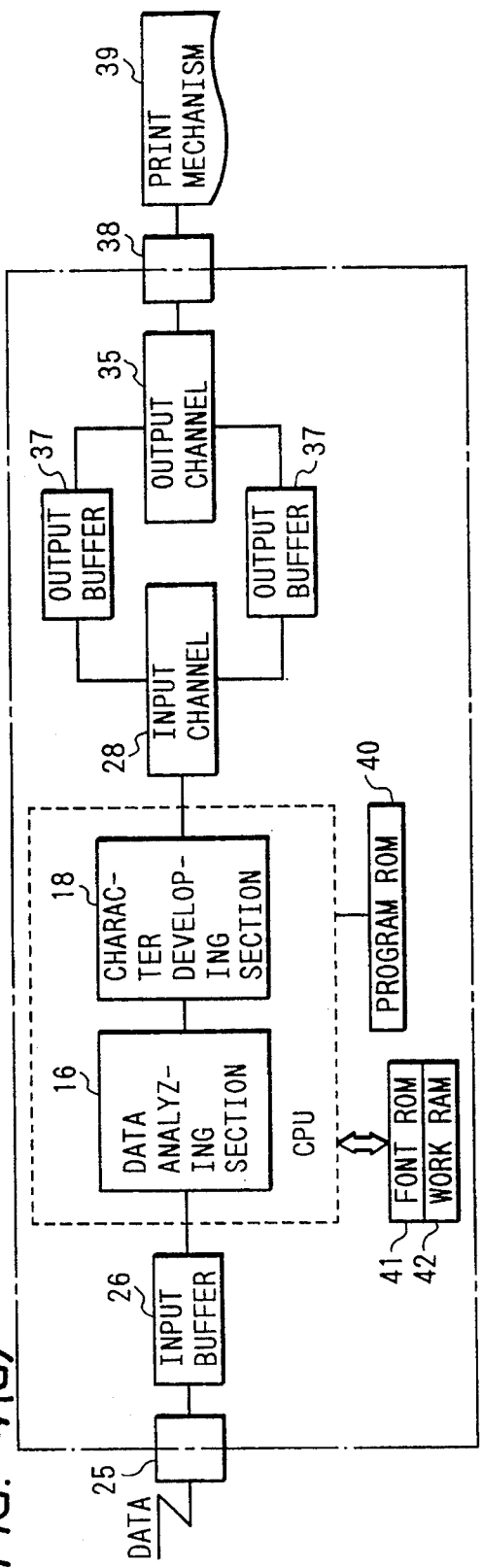
Figure 4B:
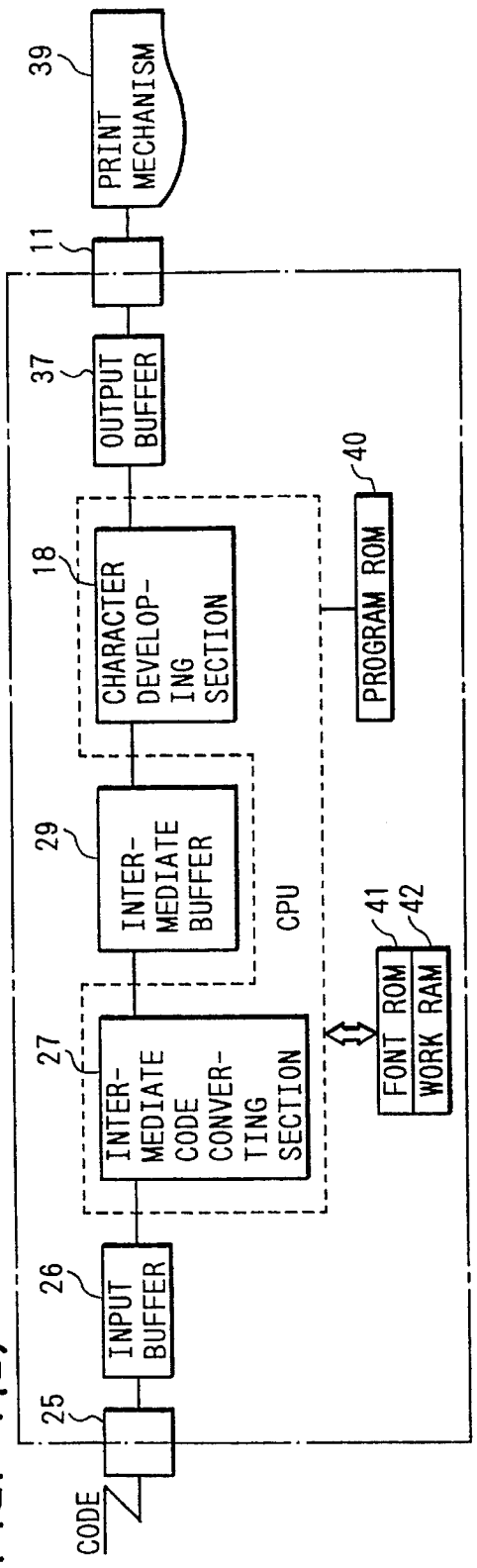
FIG. 4(b) shows a configuration with an intermediate buffer.

At least the following two methods of implementing an intermediate code storage means may be used in the embodiments of the invention. As shown in FIGS. 3(a) and 3(b), these methods differ from each other in their way of segmenting a plurality of intermediate buffers within the intermediate code storage means.

(1) Fixed length system: Each of a plurality of intermediate buffers within the intermediate code storage means has a predetermined capacity in memory, as shown in FIG. 3(a). A single intermediate code group is formed by adding an end code to the end of an intermediate code group dedicated to each line.

(2) Successive recording system: The size of each of a plurality of intermediate buffers in the intermediate code storage means is not constant, as shown in FIG. 3(b). An end sign is appended to the end of an intermediate code group dedicated to each line, and the thus-defined single line intermediate code group is treated as a single intermediate buffer.

Each of the above-described two methods will be discussed below. It is assumed that each intermediate buffer in FIGS. 3(a) and 3(b) has at least an invalid flag indicating whether the intermediate buffer itself is deletable (invalid) or not, a data length (capacity) ml of the intermediate buffer itself, a number AD1' indicating the start address of an area storing a corresponding attribute buffer, and an individual intermediate code group. Also, the intermediate buffer has, in some cases, an end code indicating the last address of the intermediate code group. Further, the length of recording data is constant since each attribute buffer in FIG. 3(c) only records numerical data or on/off data for a predetermined item. Still further, the correspondence between an intermediate buffer and an attribute buffer for a line is made through address management.

Figure 1:
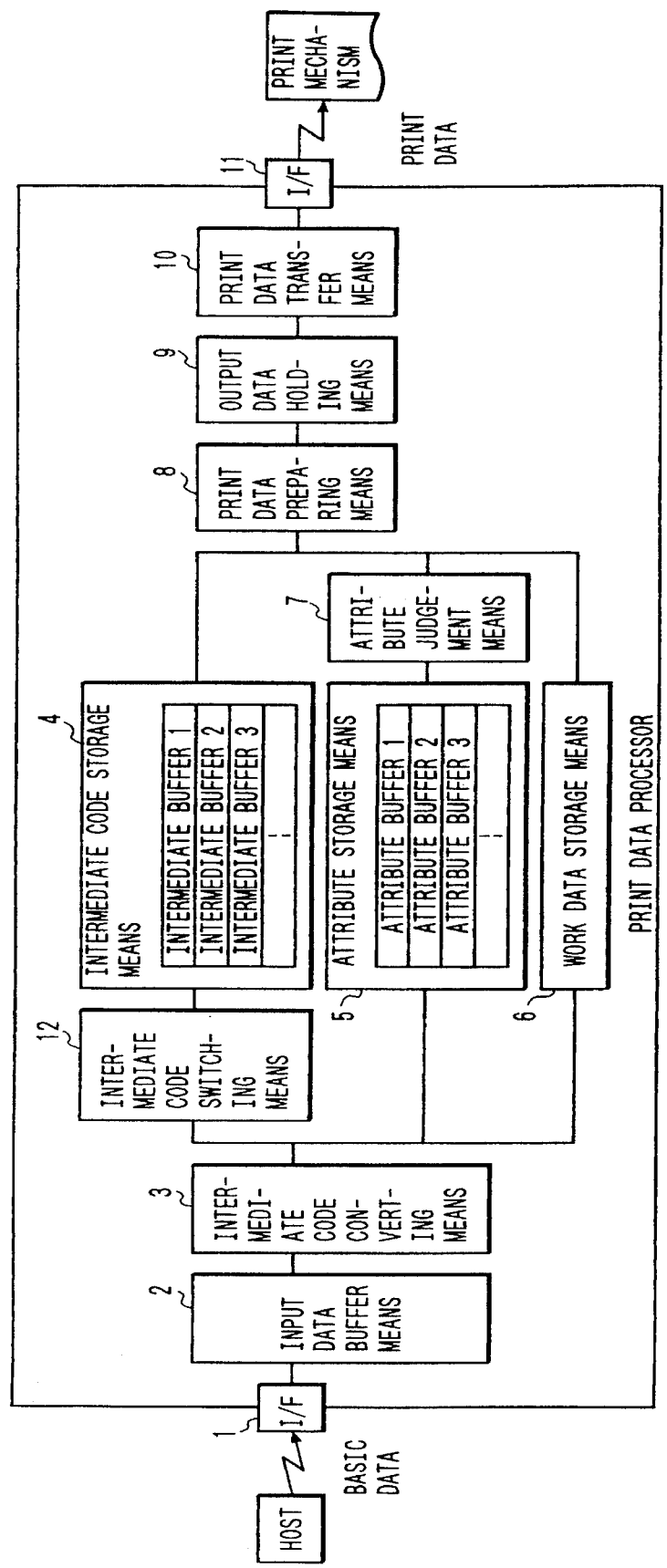
FIG. 1 is a block diagram showing a configuration of a print data processor, of the invention when a fixed length system is employed as an intermediate code storing means.

The processing in the fixed length system will be described first with reference to FIG. 1 showing the basic configuration, FIG. 3(a) showing the format of the intermediate code storage means, and FIG. 3(c) showing the format of the attribute buffer.

Basic data sequentially sent from a host computer is received through an interface 1, and is stored in an input data buffer means 2. The basic data is converted to an intermediate code by an intermediate converting means 3. The converted data is then recorded in a vacant intermediate buffer in an intermediate code recording means 4 by an intermediate code switching means 12 (FIG. 3(a)). Modification data and the position data in a sheet forwarding direction related to a line are recorded in a vacant attribute buffer in an attribute storage means 5. While the number of intermediate buffers recording intermediate codes is equal to the number of attribute buffers recording attribute data with each type of buffer having a predetermined length, the amounts of recorded data generally differ from one intermediate buffer to another since the recorded data is different from one line to another.

The operation of writing data in an intermediate buffer and in an attribute buffer corresponding to the intermediate buffer is repeated so that all the buffers in the intermediate code storage means 4 and all the attribute buffers in the attribute storage means 5 are filled. When all the intermediate and attribute buffers have been filled, the operation of preparing print data to be outputted to a print mechanism (specifically, the print data is outputted in the form of a bit image) are performed. In this operation, an intermediate buffer holding data for a scanning line area to be currently processed is selected from the position data in the sheet forwarding direction stored in all the attribute buffers, and print data is developed in the output data buffer means 9 based on the intermediate codes in the selected intermediate buffer. Such development is accompanied by modification such as coloring or double printing based on the attribute data in the corresponding attribute buffer. As a result, the print data in the scanning line area to be processed, which has been created in the output data buffer means 9, is outputted to the print mechanism by a print data transfer means 10.

An intermediate buffer whose intermediate codes have once been used for development is invalidated (or is made deletable) by setting an invalid flag, so that a group of intermediate codes created as a new line can be stored therein. Similarly, an attribute buffer whose attribute data has already been used is vacated, so that attribute data for a new line can be recorded therein. When all the buffers in the storage means have similarly been filled, the operation of preparing print data to be outputted to the print mechanism is performed.

Figure 2:
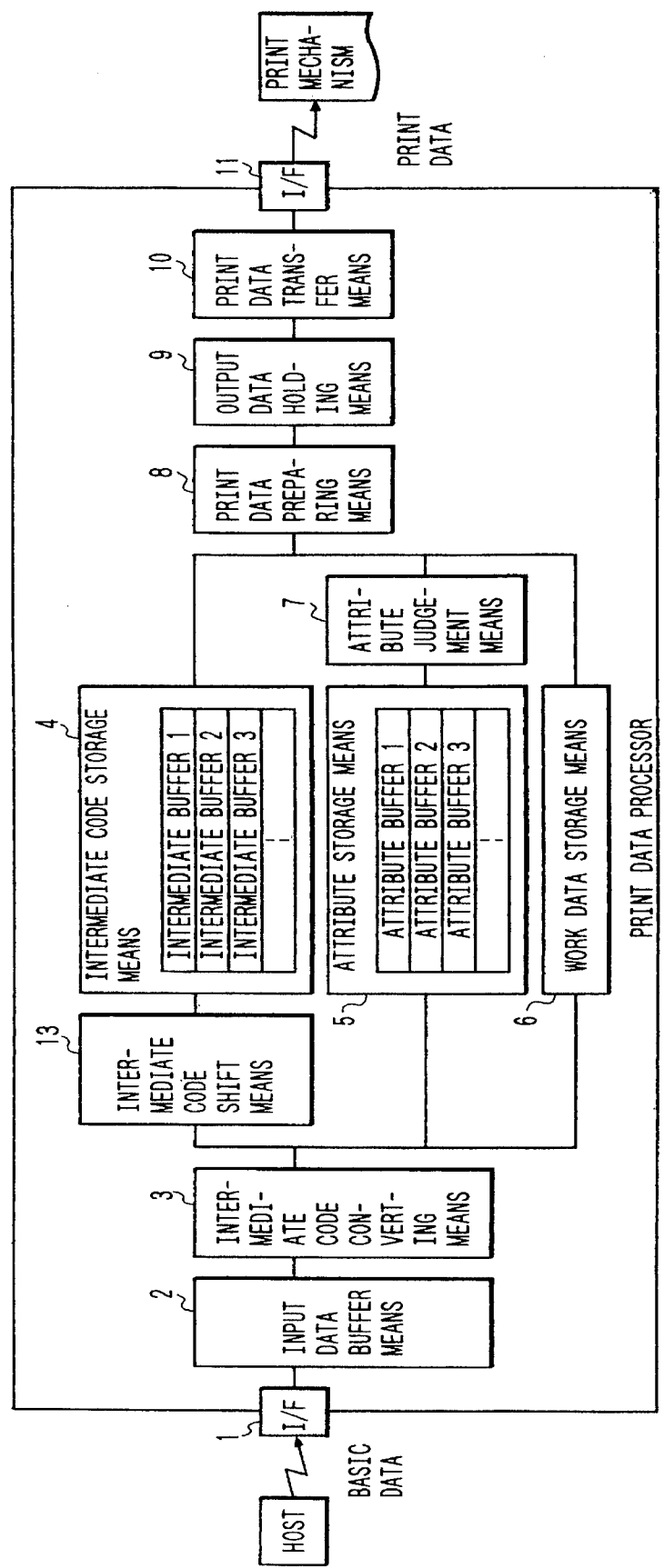
FIG. 2 is a block diagram showing a configuration of a print data processor of the invention when a successive recording system is employed as the intermediate code storing means.

The operation in the successive recording system will be described next with reference to FIG. 2 showing a basic configuration, FIG. 3(b) showing the format of an intermediate code recording means, and FIG. 3(c) showing the format of an attribute storage means.

The same operation is performed up to the steps of receiving basic data sequentially sent from the host computer line by line trough the interface 1, storing the sent data in the input data buffer means, and converting the data to a group of intermediate codes by the intermediate code converting means 3. The intermediate code group is recorded at the address next to the end code at the end of the last intermediate buffer in the intermediate code storage means 4 (see FIG. 3(b)). The end code is not particularly essential since the end of the last intermediate buffer can be calculated from the data length. The attribute storage means 5 searches a vacant attribute buffer, and modification data and the position data in the sheet forwarding direction related to a line to be processed are recorded in the vacant attribute buffer. The intermediate buffer and the attribute buffer are made to correspond to each other by sharing the start addresses of the respective buffers in a manner similar to the fixed length system. A plurality of intermediate buffers, each being segmented by the end sign, are prepared in the intermediate code storage means 4 by repeating this process until all the attribute buffers in the attribute storage means 5 are filled, whereas the attribute buffers corresponding, one to one, to the respective intermediate buffers are prepared.

Then, the same operation as in the fixed length system is carried out. That is an intermediate buffer having data for a scanning line area to be currently processed is selected from the position data in the sheet forwarding direction stored in all the attribute buffers in the attribute storage means 5, print data is developed in the output data buffer means 9 based on the intermediate code group in the selected intermediate buffer, and the developed print data is outputted to the print mechanism by the print data transfer means 10. On the other hand, the used intermediate buffer whose intermediate codes have already been used is deleted from the memory, i.e., the intermediate code storage means 4, and a series of intermediate buffers following such deleted buffer are shifted "upward" by a method that will be described later. It is an intermediate code shift means 13 that performs such a shifting operation.

After the buffers are shifted, intermediate codes related to a new line are recorded immediately after the end code of the end of the intermediate buffer located at the end of the address. In the meantime, the data in the vacated attribute buffer is deleted, and attribute data for the new line is recorded therein.

From the above-described two methods, it is understood that the invention is characterized as judging an intermediate buffer that has data for a scanning line to be processed from the position data in the sheet forwarding direction held by an attribute buffer in the development process in the output data buffer means 9. As a result, the operation of printing a scanning line with the print head and of returning the head to a scanning line before such scanning line to supplement an insufficient portion to the previously printed portion is never required. The concept of the invention rests on the fact that a plurality of intermediate buffers are provided so that a plurality of lines can be processed concurrently and that the position data in the sheet forwarding direction is managed within the attribute buffers individually so that the intermediate code data in the intermediate buffers can be managed efficiently.

Figure 5:
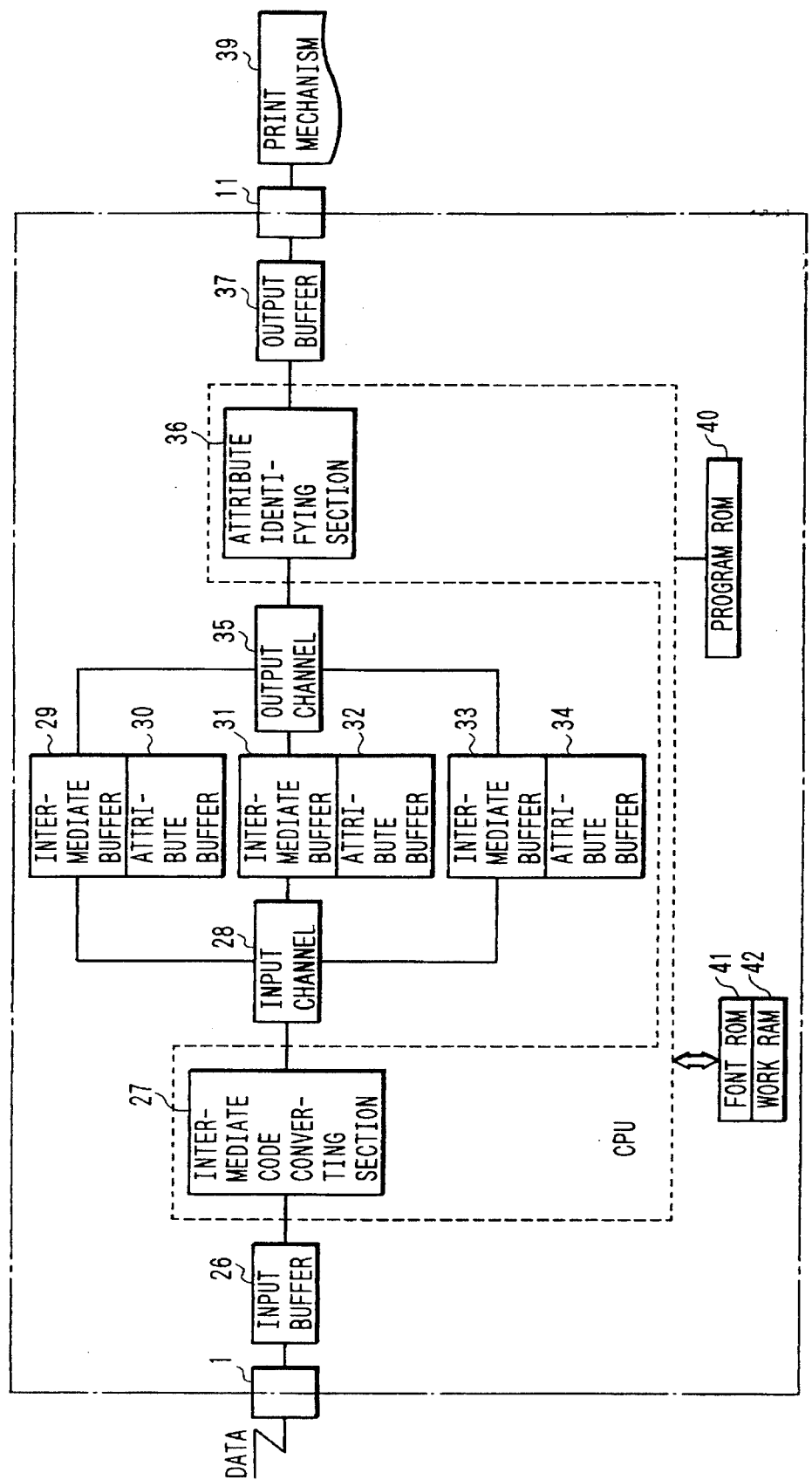
FIG. 5 is a block diagram specifically showing a configuration of a print data processor of the invention.

The print data processing apparatus of the invention will be described in more detail with reference to the block diagram of FIG. 5. The fixed length system is employed for implementing the intermediate code storage means 4. The intermediate code storage means 4 can store a maximum of three lines of data. Since the intermediate code storage means 4 is actually implemented by a RAM, the intermediate code storage means 4 will hereinafter be referred to as an "intermediate buffer memory."

In comparison with FIG. 1, the input data buffer means 2 corresponds to an input buffer 26, the intermediate code converting means 3 to an intermediate code converting section 27, the intermediate code storage means 4 to intermediate buffers 29, 31 and 33, the attribute storage means 5 to attribute buffers 30, 32 and 34, the attribute identifying means 7 and the print data preparing means 8 to an output channel 35 and an attribute identifying section 36, the output data buffer means 9 and the print transfer means 10 to an output buffer 37, the work data storage means 6 to a work RAM 42, and the control means to a program ROM 40 for storing various control programs and a CPU for controlling such programs. A font ROM 41 stores character fonts. The input channel 28 searches an intermediate buffer into which intermediate codes for a new line can be inputted out of a plurality of intermediate buffers and selects such buffer.

The flow of an operation will be described below. Basic data sent from a host computer is received through the interface 1 and stored in the input buffer 26. The intermediate code converting section 27 converts the basic data stored in the input buffer 26 to intermediate codes, which are sequentially stored in the intermediate buffers 29, 31 and 33 while selecting a vacant one therefrom through the input channel 28. Switching among the intermediate buffers is done by the input channel 28 with a print start command as a trigger. Concurrently therewith, a vacant attribute buffer from among the attribute buffers 30, 32 and 34 is selected to store position data such as a reference position in the sheet forwarding direction, the uppermost position, and the lowermost position, as well as modification data for a line to be processed. These operations are repeated until no more additions can be made. The developing and outputting operation will then be performed at the stages from the output channel 35 onward.

In the above-described developing and outputting operation, an intermediate buffer having data to be printed at the current print head position is selected from the intermediate buffers 29, 31 and 33, from the position data in the sheet forwarding direction held by all the attribute buffers 30, 32 and 34 in the attribute storage means. The intermediate codes contained in the selected intermediate buffer are developed in the work RAM 42 to prepare print data. In handling characters, font data is obtained from the font ROM 41, and a necessary portion is retrieved, judging the obtained font data from the position data stored in the attribute buffer corresponding to the intermediate buffer being developed. After being modified, the obtained character data is developed in the output buffer 37, and finally outputted to the print mechanism through the output interface. Upon judgment that the corresponding intermediate buffer has been used at the time the lowermost position within the attribute buffer holding the post-print head position has been exceeded, the invalid flag of the intermediate buffer is set. As a result, the intermediate buffer is ready to be deleted so that intermediate codes for a new line can be written. On the other hand, the corresponding attribute buffer is prepared to be deleted so that new line data can be written.

Figure 6:
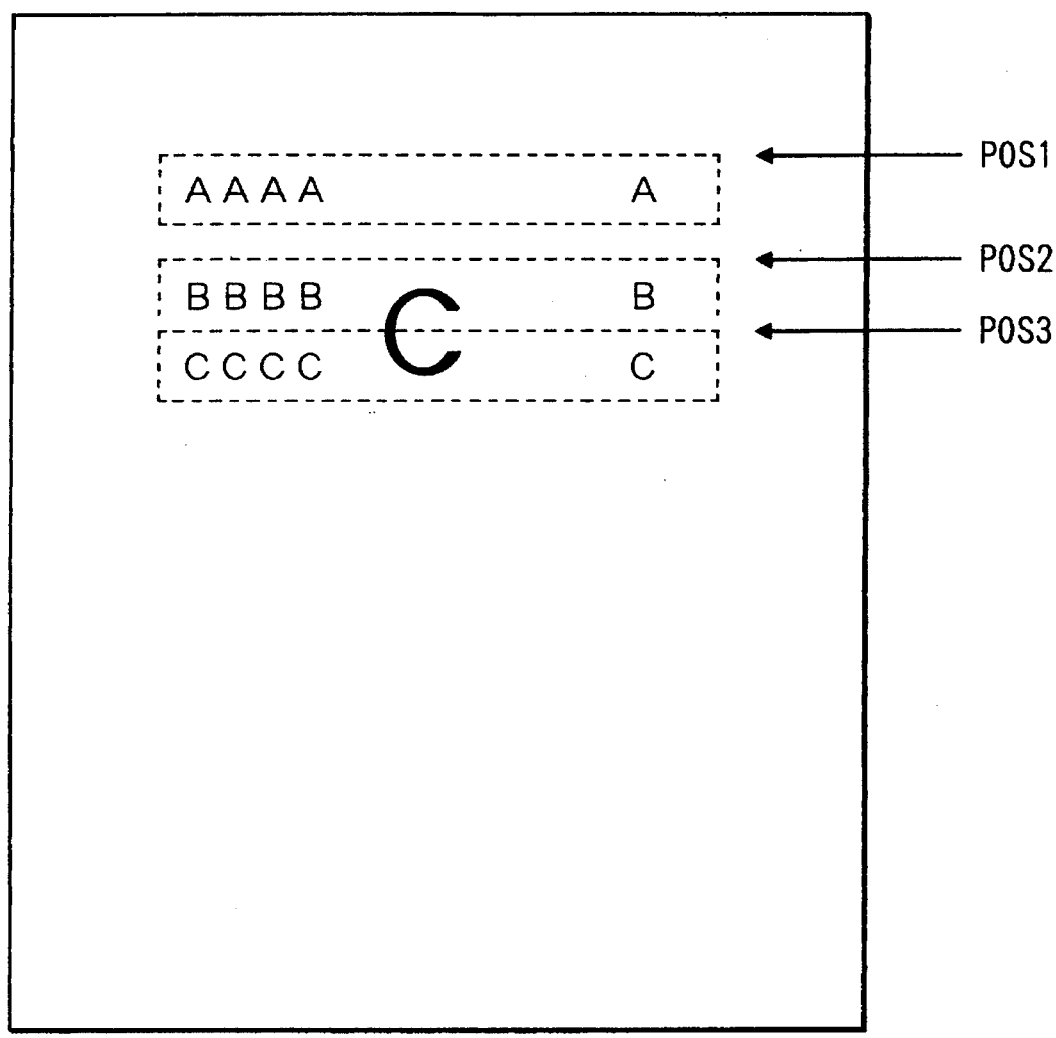
FIG. 6 is a diagram showing examples in which printing has been effected on a single print sheet by a print data processor of the invention.

The actual processing flow will be described in two steps: buffer storing processing for processing basic data and storing the processed data in intermediate buffers and attribute buffers, and developing and outputting processing for developing the data stored in intermediate buffers and attribute buffers in an output buffer 37 in bit image form and outputting the developed data to the print mechanism. In the above processing, it is assumed that the basic data is sent from the host computer so that printing such as is shown in FIG. 6 can be effected, and that the print head in the print mechanism is located an POS1 when initialized. Further, it is supposed that the height of a rectangle depicted by a broken line is equal to a single scanning line equivalent to a single scanning operation by the print head. The intermediate code storage means is of the above-described successive recording type.

The processing for storing basic data in the intermediate buffers and the attribute buffers will be described first with reference to FIGS. 7 and 8.

Figure 7:
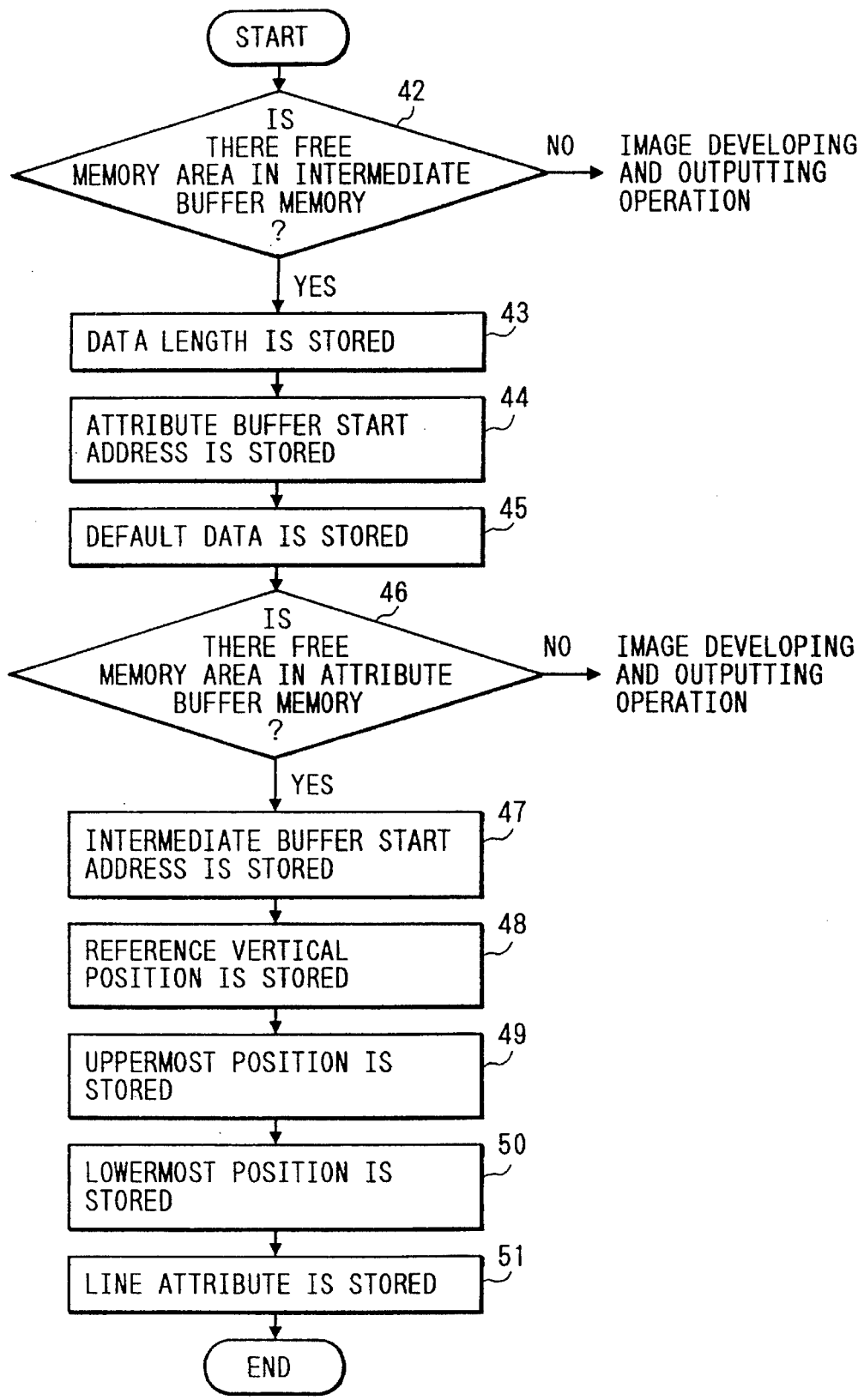
FIG. 7 is a flowchart showing the operation of setting defaults of the intermediate buffer and the attribute buffer.

The flowchart shown in FIG. 7 describes the default setting (initialization) operation for setting defaults (an invalid flag, a data length m1, an attribute buffer start address AD1', character modification data, etc.) to the intermediate buffer and the attribute buffer dedicated to a new line.

First of all, whether a free memory area large enough to allow the default data to be newly added is available in the intermediate buffer memory (an intermediate code storage means) is present or not is checked (Step 42). If such memory is not available, a vacant area for newly writing intermediate codes is reserved in the RAM by performing the developing and outputting operation.

If an area for newly writing the intermediate codes is available in the RAM, the invalid flag indicating that the area is not vacant is reset and default data, such as the data length m1, the corresponding attribute buffer start address AD1', and character modification at the time specific intermediate codes are not yet recorded, are stored therein (Steps 43, 44 and 45).

Then, whether a vacant attribute buffer allowing new attributes to be stored is available or not is checked (Step 46). If such attribute buffer is not available, a new attribute buffer is reserved by performing the developing and outputting operation.

Once the attribute buffer for writing new attributes has been reserved, the corresponding intermediate buffer start address AD1 (Step 47), a value POS1 indicating the reference vertical position of a line (the uppermost position of a normal character) (Step 48), a value indicating the uppermost position (POS1 when initialized, Step 49), a value indicating the lower-most position ("POS1+the height of a character" when initialized, Step 50), and other attributes are stored in the vacant attribute buffer.

The operation of setting the defaults to the intermediate buffer and the attribute buffer is completed by the above processing.

Figure 8:
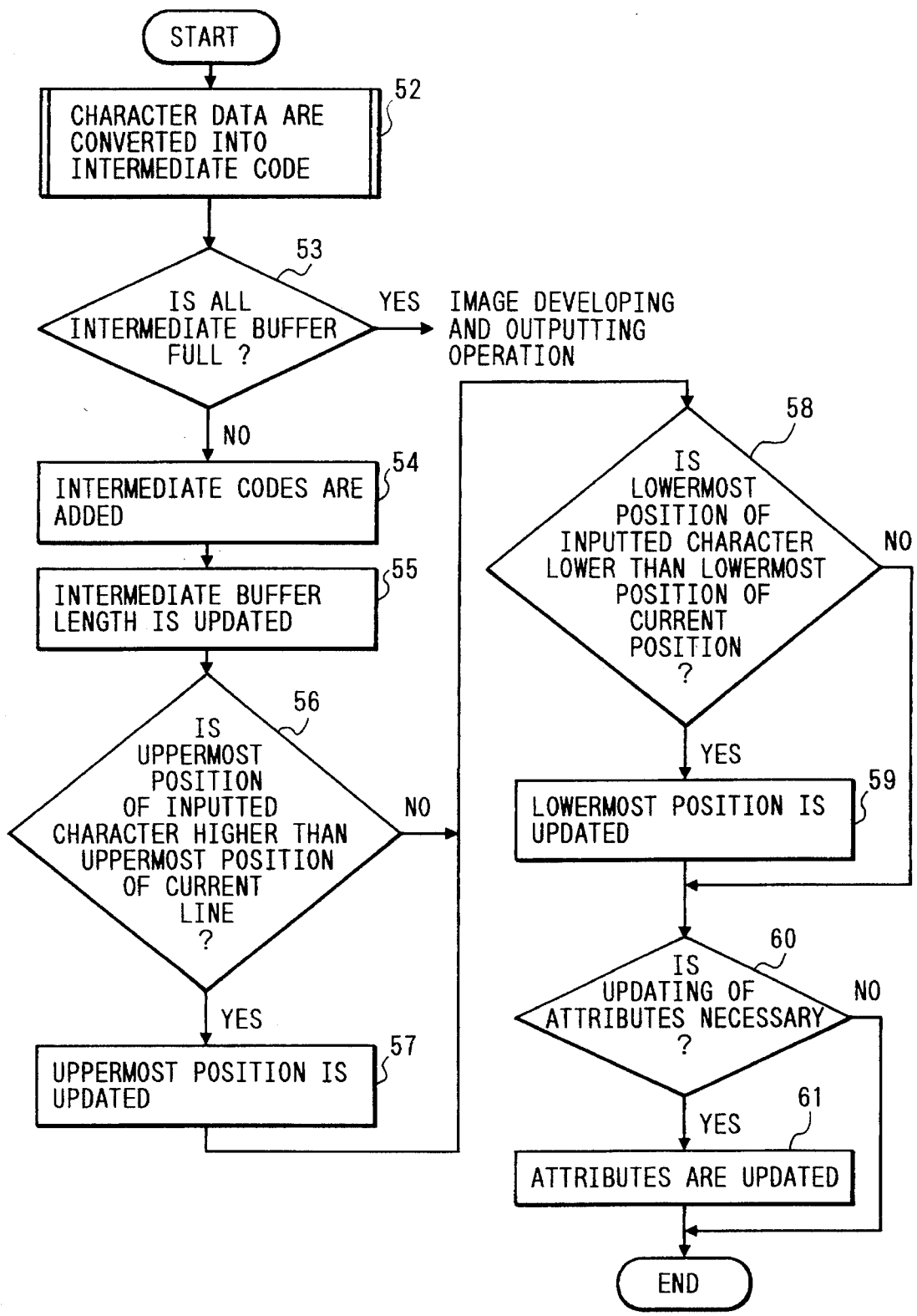
FIG. 8 is a diagram showing sheet forwarding position data corresponding to a flowchart showing the operation of processing data in the intermediate buffer and the attribute buffer.

FIG. 8 is a flowchart illustrative of the operation of the intermediate buffer and the attribute buffer in the case where character data A A . . . A are inputted from the host computer after having set the defaults described with reference to FIG. 7.

Upon input of the character data, the character data are converted to intermediate codes (Step 52). Then, whether an area for adding a new intermediate buffer to the RAM, which is the intermediate code storage means, is available or not is checked (Step 53). If such area is not available, the developing and outputting operation is performed.

If the area for adding new intermediate codes is available in the RAM, the intermediate codes indicating specific addresses of the character data in the ROM in addition to the defaults described with reference to FIG. 7 are added (Step 54). An intermediate buffer length m1 is updated in the RAM as the last step (Step 55).

If the uppermost position of the inputted character is found to be higher than the uppermost position of the current line (Step 56), then the uppermost position in the attribute buffer is updated (Step 57). If the lower-most position of the inputted character is found to be lower than the lowermost position of the current position (Step 58), then the lowermost position in the attribute buffer is updated. Similarly, whether the other attributes need to be updated or not is checked (Step 59). If such updating is necessary, the attributes are updated (Step 60).

The above-described flow is thereafter repeated until the total character width of the currently processed line exceeds the right margin or until a print start command is received (if the total character width exceeds the right margin, the LF command operation is performed). In this embodiment the preparation for a first line (hereinafter referred to as "line A") is completed when the print start command has been received. The preparation for a next line is then begun.

A second line (line B) is processed according to the flowchart shown in FIG. 7 in a manner similar to that of the line A. An attribute buffer, intermediate codes, and an intermediate buffer storing defaults thereof are added for the line B. That is, these pieces of data, i.e., a default data length m2, a new attribute buffer start address AD2', and a default, are added in the intermediate buffer area following the end code of the intermediate buffer for the line A. Further, the intermediate codes for the inputted character data B B . . . B are added. The intermediate buffer length 2 m is updated every time the intermediate codes are added.

On the other hand, line attributes, such as AD2 indicating an intermediate buffer start address (an address for storing m2), a vertical position POS2 of the line, an uppermost position, a lowermost position, etc., for the second line, are stored in the attribute buffer. The value POS2 is calculated so that POS2–POS1 equals the sheet length to be forwarded in response to a command.

Further, upon reception of a print start command, a third line is similarly prepared, and the same flow is repeated.

The above-described operation is repeated until the intermediate buffer or the attribute buffer is completely filled (it is assumed, in this embodiment, that the buffers are filled with three lines). When no more data can be added, a developing operation command is issued to start the operation of developing and outputting the intermediate buffer. By repeating this operation, the basic data inputted from the host computer are sequentially stored in the intermediate buffer memory.

The above is the buffer storing operation.

Then, the developing and outputting operation in which the data stored in the buffer is converted to a bit image and outputted as print data will be described with reference to FIG. 9.

This operation involves the steps of judging a line printable at the current head position by checking the attributes for all the lines (Steps 62 to 70), developing the print data only for the current line using a work RAM 42, adding modification in accordance with the attribute data, and outputting the thus-processed data to the print mechanism by writing them to the output buffer 37. This operation is characterized as forwarding a sheet through a distance required for next printing in advance while always checking the attribute buffers for all the lines every time the print head scans (Steps 72 to 80). As a result, printing of the previous line by reversely forwarding the sheet is never required.

The above-described operation will be described with reference to the flowchart of FIG. 9. Whether or not the first accessed line is a deleted line or not is checked (Step 63). If so, a jump to Step 69 takes place. The deleted line to be checked here will be described with reference to Step 68.

If the first accessed line is not a deleted line, whether or not the line is a printable line is checked (Step 64). This is judged by comparing the lowermost dot position of the current head and the uppermost position in the attribute buffer being accessed. If the lowermost dot position of the current head is lower than the uppermost position in the attribute buffer, then the line concerned is in a printable position, and the operation of developing the data in the output buffer is started (Step 65). The example shown in FIG. 6 indicates that the current head position is at POS1, which indicates that only the line A is printable. Thus, only the intermediate buffer for the line A is accessed, and the print data thereof is developed in the output buffer.

After having developed the data in image form, the uppermost position in the attribute buffer corresponding to the developed line is altered to a position next to the lowermost dot position of the current head (Step 66).

When the uppermost position has become lower than the lowermost position by this alteration, the system judges that all the images for the line A have been printed (Step 67), and the line A is deleted (Step 68). In the example shown in FIG. 6, the line A is composed only of normal characters, which allows all the images to be printed through a single round of scanning by the print head. As a result, the line A is discarded thereafter, and the intermediate buffer having the data thereof becomes deletable. To make the printed line deletable, the attribute buffer of the line is deleted, and an invalid flag of the corresponding intermediate buffer is set. In order not to reduce the throughput, the used intermediate buffer is deleted at the time the intermediate buffer area overflows.

After the steps 63 to 70 have been performed for all the lines in this way, the print operation is executed (Step 71).

All the lines are checked thereafter, for lines to which the distance between the uppermost position of the remaining lines and the current head position POS1 becomes a minimum (Steps 73 to 79), and the sheet is forwarded in amounts equal to the obtained minimum (Step 80). Lines B and C are the closest lines in the example shown in FIG. 6.

With respect to the line B, which has POS2 as a reference position and is composed only of normal characters, the uppermost position of the line is POS2. On the other hand, while the reference position of the line C is apart from POS2 by the height of a normal character, the existence of an enlarged character in the line makes the uppermost position of the line be POS2. Therefore, the uppermost position of the remaining lines becomes POS2, and the sheet is forwarded by an amount equal to POS2–POS1 to move the sheet to the position POS2. The head is positioned at POS2 thereafter. The above operation completes the sequence for the first pass.

Similarly, the sequence for the second pass is performed. A line to be printed at position POS2 is searched. In the example, the lines B and C are in printable positions. Therefore, the intermediate buffers for the lines B and C are accessed to develop the image data in the output buffer and to print the developed data. With respect to the line C, only the upper half portion to be printed at POS2 is developed in the output buffer. The line B is composed only of normal characters, thereby allowing all the images to be printed through a single round of scanning. Therefore, the line B is discarded after printing has been effected and is thus deletable. The line B is deleted by deleting the attribute buffer and setting an invalid flag in the corresponding intermediate buffer.

With respect to the line C, the attribute, more specifically, the uppermost position, in the attribute buffer is updated so that only the printed portion can be deleted. In the example, the uppermost position is updated to POS3. Similarly, remaining lines (only line C remains at this point) are checked, the distance POS3–POS2 between the uppermost position (POS3 at this point) of the remaining line is calculated. It is this amount by which the sheet is forwarded. The head is positioned at POS3 after the sheet forwarding operation.

Then, a line to be printed at this position is searched. In the example, the line C is located at the printable position. Therefore, the intermediate buffer for the line C is accessed, the image data is developed in the output buffer, and the developed image data is printed. It is only the remaining lower half portion of the line C that is developed at this point of the sequence. Since all the images of the line C Are printed by this printing operation, the printed data becomes deletable and is discarded, as in the case of the lines A and B.

The above describes how the developing and outputting operation in which the data stored in the buffers are processed into printed data and the printed data is outputted. In summary, defaults are set by following the flow shown in FIG. 7, intermediate codes are recorded in the attribute buffer by following the flow shown in FIG. 8, and data is developed, outputted, and printed every line by following the flow shown in FIG. 9.

The operation according to the successive recording system will be described in which the discarded intermediate codes are deleted after the data has been developed and outputted and the intermediate code groups following the deleted portion in terms of address are shifted to an area where the deleted portions were located. It is assumed that the intermediate buffer memory already has received intermediate buffers for three lines and that the intermediate buffers for the first and second lines are to be deleted. As shown in FIG. 11(a), it is assumed that the first, the second, and the third buffer are successively recorded from the start address of the intermediate buffer memory, and that the operation of shifting the third intermediate buffer, to the start address of the intermediate buffer memory which remains to be performed after having deleted the first and the second buffer, is performed. In the intermediate buffer memory, whether the intermediate buffer is deletable or not is judged from binary data set as the invalid flag in the intermediate buffer.

In FIG. 11(a), the invalid flag of the first and the second intermediate buffer is set to 1, indicating that the buffer is deletable, whereas the invalid flag of the third intermediate buffer is set to 0, indicating that the buffer is not deletable. Further, a code [IPT] indicates a start address from which new intermediate buffers can be inputted, and a code [LNG] indicates intermediate buffer length data (m1, m2, etc.) contained in each intermediate buffer. In transferring non-deletable intermediate buffers to different addresses in the intermediate buffer memory, the source start address of the intermediate buffer is [SAD], and the destination start address is [DAD]. However, [SAD] and [DAD] are initially set to the start address of the intermediate buffer memory.

Figure 11:
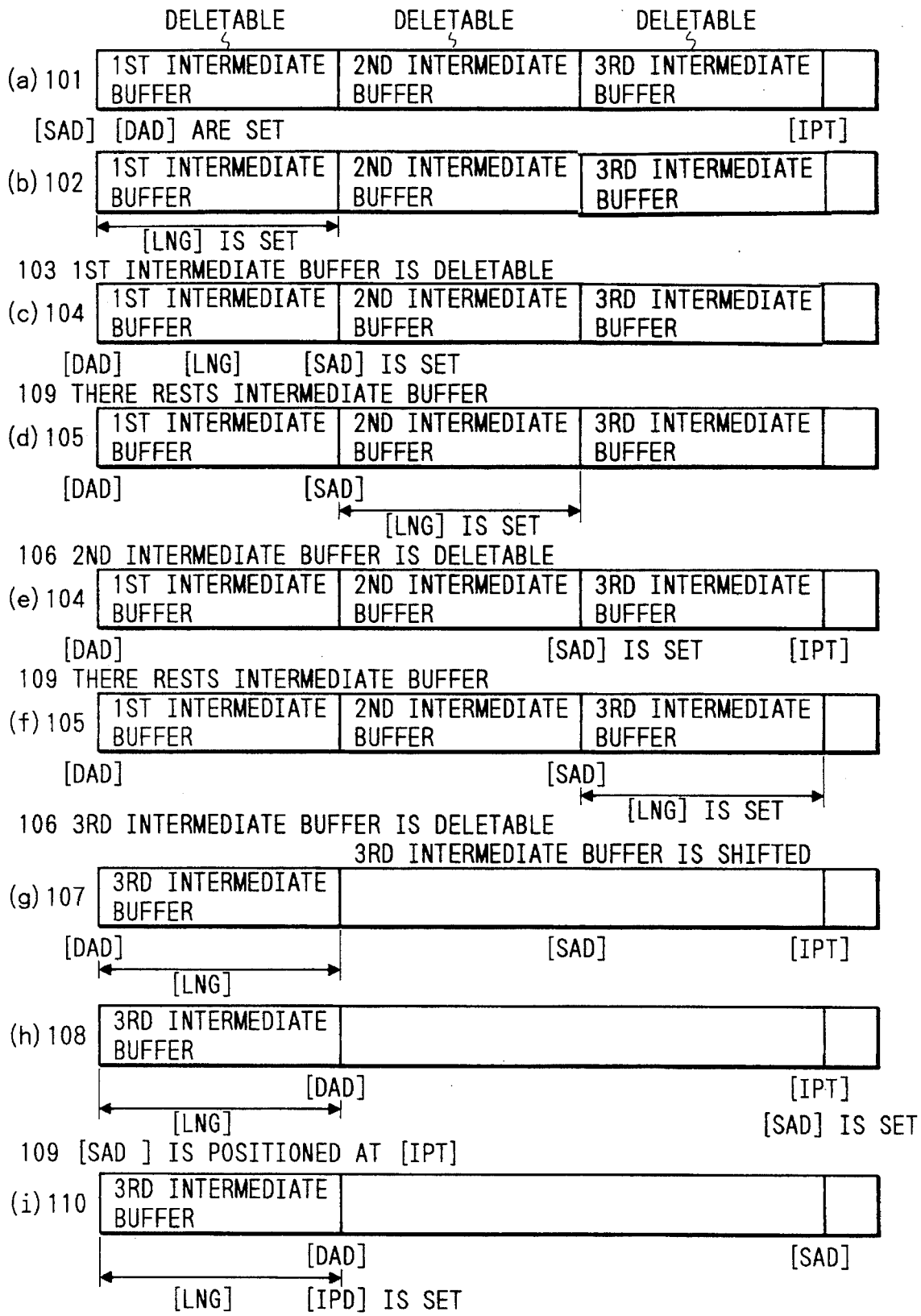
FIG. 11 is a diagram illustrative of the operation of deleting an invalid intermediate buffer in the intermediate code storing means.

This operation will be described with reference to FIGS. 10 and 11.

In Step 101 of FIG. 10, [SAD], [DAD], and [IPT] are initialized as shown in FIG. 11(a). In Step 102, [LNG] is set to m1 indicating the buffer length of the first intermediate buffer. In Step 103, whether or not the intermediate buffer being processed is deletable is judged. Since the intermediate buffer is deletable, Step 104 is performed, in which [SAD] is shifted to the start of the second intermediate buffer, as shown in FIG. 11(c). More specifically, this is done by updating [SAD] while setting thereto a value obtained by adding [LNG] to [SAD]. In Step 109, [SAD] is compared with [IPT] in order to check that they are the same. If they are the .same, the transfer by shifting has been completed. Since they are not the same yet in this particular case, the operation goes on to Step 105. In Step 105, [LNG] is set to m2, a value indicating the second intermediate buffer length that is a next processing item (see FIG. 11(d)). In Step 106, whether or not the intermediate buffer being processed is deletable is judged again. Since the second intermediate buffer is also deletable, the operation goes to Step 104. In Step 104, [SAD] is shifted to the start of the third intermediate buffer as shown in FIG. 11(e). Since [SAD] has not reached the address [IPT] in Step 109, which is a next step, the operation is advanced to Step 105. In Step 105, [LNG] is set to m3, a value indicating the length of the third intermediate buffer, which is a next processing item (see FIG. 11(f)). However, in Step 106, since the third intermediate buffer has not yet been developed, the buffer is not deletable. Thus, the operation is advanced to Step 107, in which all the contents of the third intermediate buffer after [SAD] are collectively shifted to an address starting with [DAD] et seq. in the intermediate buffer memory. FIG. 11(g) shows such condition. The start address of the third intermediate buffer whose length [LNG] is set to m3 is shifted from [SAD] to [DAD]. In Step 108, which is a next step, [SAD]and [DAD] are shifted rightward by [LNG] while adding [LNG] to [SAD] and [DAD], respectively (see FIG. 11(h)). Since [SAD]has finally arrived at the address [IPT], it is instructed in Step 109 to proceed to Step 110. In Step 110, [IPT] indicating an address from which new intermediate buffers are recorded is set to a new [DAD] shown in FIG. 11(h).

From the foregoing, the intermediate buffers for the first and second lines which are to be deleted are deleted from the intermediate buffer memory, whereas the third intermediate buffer is collectively shifted to the start of the intermediate buffer memory. This completes this series of operations.

As is apparent from the above description, the major object of the invention is to obviate printing involving reverse sheet forwarding, and to achieve this object the invention is characterized as causing the intermediate buffer memory to have a plurality of intermediate buffers simultaneously and causing the corresponding attribute buffers to have position data in the sheet forwarding direction to efficiently supervise such plurality of intermediate buffers.

What is claimed is:

1. A print data processing apparatus coupled between a host computer and a print apparatus, said print data processing apparatus comprising:

input data holding means for holding basic data received through an interface from the host computer;

intermediate code converting means for preparing intermediate codes by converting the basic data held by said input data holding means;

intermediate code storage means having a plurality of intermediate buffers for dividing the intermediate codes into a plurality of intermediate code groups, and sequentially storing each of the intermediate code groups in an intermediate buffer;

an attribute storage means, having a plurality of attribute buffers, each attribute buffer storing modification data and position data in a sheet forwarding direction for each of the intermediate code groups stored in a corresponding intermediate buffer, the modification data and position data in a sheet forwarding direction being prepared using the basic data held by said input data holding means;

a single scanning line judgment means for selecting the intermediate buffers related to a single scanning line to be currently processed on the basis of the respective position data in the sheet forwarding direction stored in said attribute buffers in said attribute storage means; and a print data preparing means for preparing print data from the intermediate code groups held by the intermediate buffers selected by said single scanning line judgment means and the respective modification data stored in the attribute buffers.

2. A print data processing apparatus according to claim 1, wherein said intermediate code storage means stores a plurality of the intermediate code groups continuously in a memory space in such a manner that, when one of the intermediate code groups at an arbitrary address in the memory space is no longer needed, subsequent intermediate code groups are collectively shifted in the memory space so that the arbitrary address becomes occupied by a portion of the subsequent intermediate code groups.

3. A print data processing apparatus according to claim 1, wherein said intermediate code storage means stores a plurality of the intermediate code groups, said intermediate buffers each have a predetermined data storage capacity, and when one of the intermediate code groups held by a given intermediate buffer at an arbitrary address in a memory space is no longer needed, a subsequent intermediate code group is stored in the given intermediate buffer, so that the given intermediate buffer becomes occupied by the subsequent intermediate code group.

4. A print data processing apparatus according to claim 1, wherein the position data in said attribute storage means comprises data for an uppermost position, a lowermost position, and a reference position in a sheet forwarding direction for print characters in each of the intermediate code groups.

5. A print data processing apparatus according to claim 1, wherein a height of a single scanning line corresponds to a length of a printing head in a sheet forwarding direction.

6. A print data processing apparatus according to claim 1, wherein the division of said intermediate codes into a plurality of intermediate code groups by said intermediate code storage means is done on the basis of return codes, which is included in said input data holding means.

* * * * *